J. KOSTKA.
QUICK ACTION HORSESHOE.
APPLICATION FILED JAN. 25, 1915.

1,137,984.

Patented May 4, 1915.

2 SHEETS—SHEET 1.

Witnesses
Inventor
J. Kostka
By A. M. Wilson
Attorney

J. KOSTKA.
QUICK ACTION HORSESHOE.
APPLICATION FILED JAN. 25, 1915.
1,137,984.
Patented May 4, 1915.
2 SHEETS—SHEET 2.
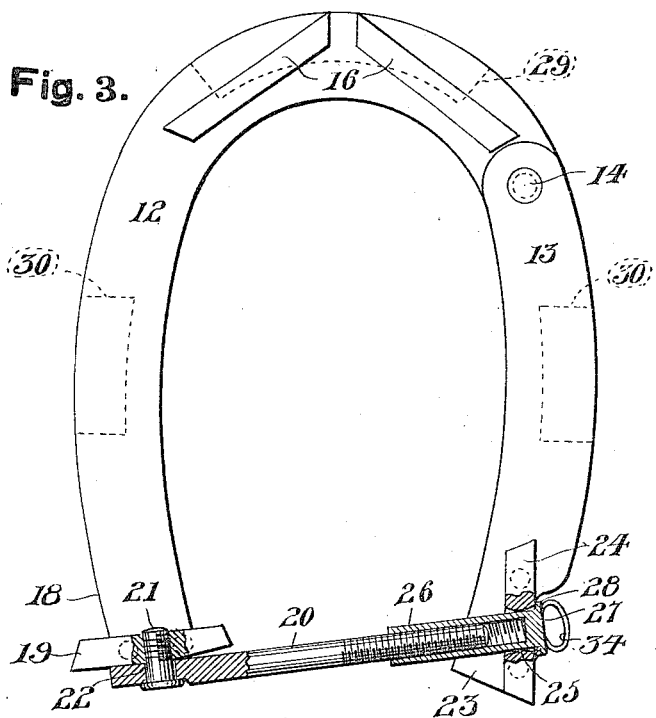
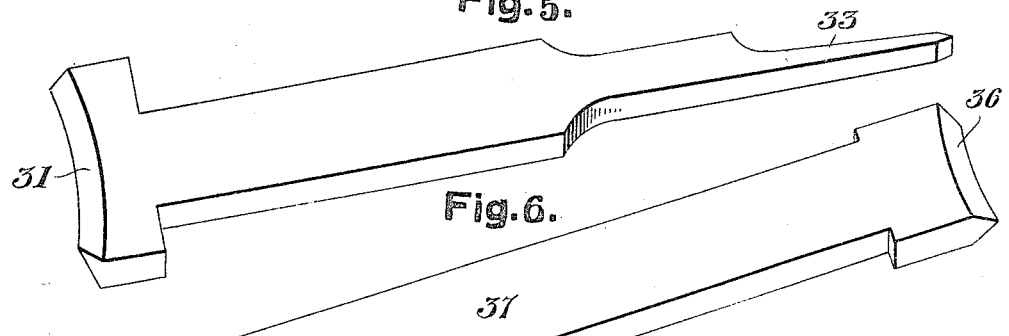
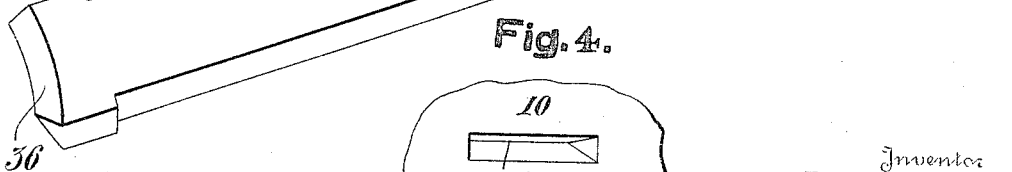
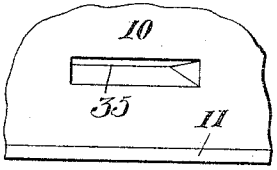
Inventor
J. Kostka

UNITED STATES PATENT OFFICE.

JOHN KOSTKA, OF INDIANA HARBOR, INDIANA.

QUICK-ACTION HORSESHOE.

1,137,984.  Specification of Letters Patent.  Patented May 4, 1915.

Application filed January 25, 1915. Serial No. 4,305.

*To all whom it may concern:*

Be it known that I, JOHN KOSTKA, a citizen of the United States of America, residing at Indiana Harbor, in the county of Lake and State of Indiana, have invented certain new and useful Improvements in Quick-Action Horseshoes, of which the following is a specification.

This invention relates to new and useful improvements in quick action horse shoes.

The primary object of this invention is the provision of a horse shoe that may be readily attached to the hoof of the animal by the owner and without the necessity of employing a professional horse-shoer.

A further object of the device is to provide a clamping shoe which may be readily positioned upon a horse's hoof either over the old shoe or after the usual shoe has been removed therefrom, the present invention being then readily clamped in a secure locking engagement with the hoof.

A still further object is to provide a horse shoe formed in two hinged sections, each having a hoof engaging claw portion and provided with a heel positioned closing clamp for locking the shoe upon the hoof with the said claws slightly embedded therein.

With these general objects in view and others that will appear as the nature of the invention is better understood, the same consists in the novel combination and arrangement of parts hereinafter fully described, illustrated in the accompanying drawings and pointed out in the appended claims.

Figure 1:
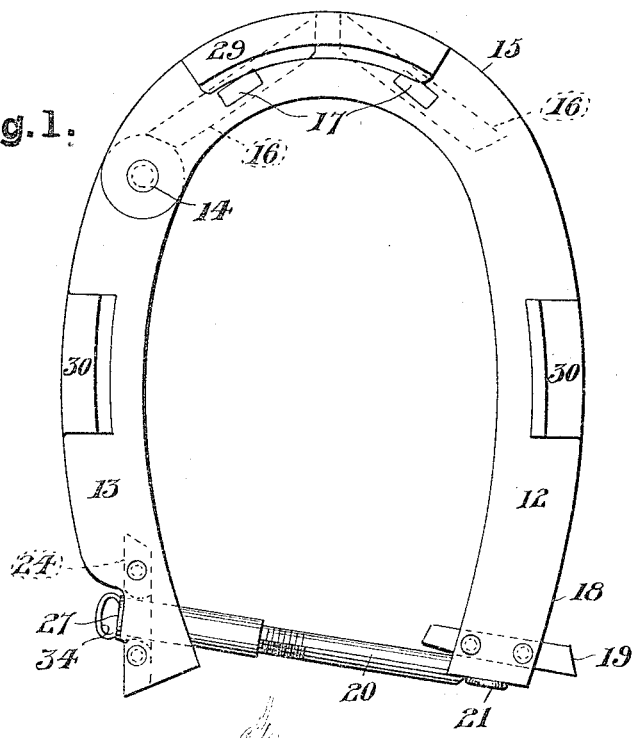
Figure 2:
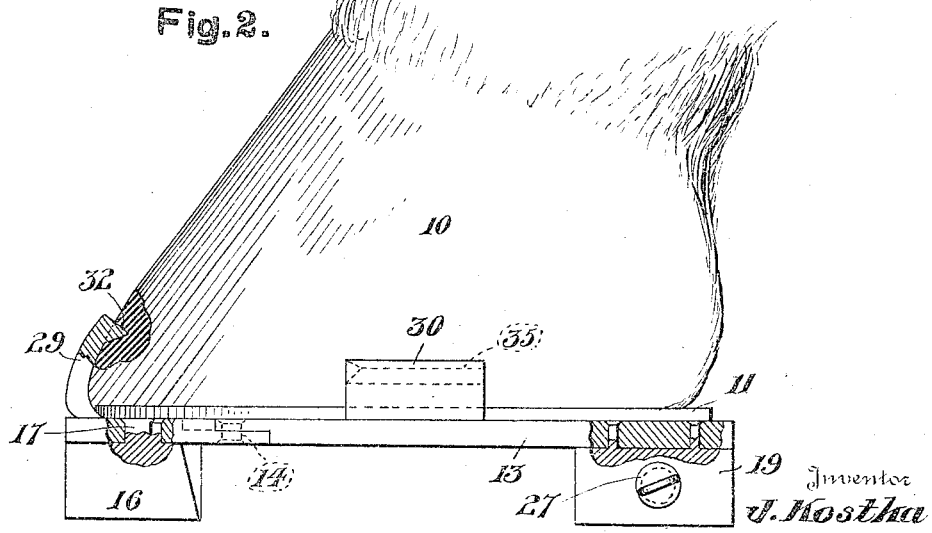

In the drawings forming a part of this application and in which like designating characters refer to corresponding parts throughout the several views:—Figure 1 is a top plan view of the shoe detached. Fig. 2 is a side elevation thereof partially broken away and illustrated as clamped in position upon a horse's hoof. Fig. 3 is a bottom plan view of the shoe detached. Fig. 4 is a side elevation of a portion of the hoof showing the claw engaging socket therein, and Figs. 5 and 6 are perspective views of the hoof socket forming implements.

Referring more in detail to the drawings, a horse's hoof 10 is illustrated in Fig. 2 provided with the usual flat metal shoe secured to the bottom thereof and provided with the present invention clamped in its locked position upon the hoof and over the said flat shoe.

The present form of quick action shoe is adapted to be quickly attached to and detached from its operative position and is formed of two sections 12 and 13 hinged together by a pintle pin 14 and together assuming the usual arch form of a horse shoe, it being noted that the section 12 is larger than the section 13 and includes the toe portion 15 of the shoe.

The toe calks 16 are provided two in number and secured projecting from the under surface of the toe portion 15, being set at an angle and converging forwardly as shown in Figs. 1 and 3 of the drawings and being permanently secured to the shoe section 12 by means of rivets 17 which are rectangular in cross section.

The heel portion 18 of the section 12 is provided with a transversely mounted calk 19 secured to the lower face thereof and having its opposite ends projecting from the opposite sides of the section 12. A bolt 20 is swingingly pivoted to the said calk 19 by means of a screw 21, the said screw loosely projecting through a perforation 22 in the adjacent end of the bolt.

The heel portion 23 of the section 13 has a longitudinally positioned calk 24 secured to and projecting from its lower face, the said calk 24 having a perforation 25 extending transversely therethrough and in which a tubular internally threaded socket bolt 26 is loosely journaled. The bolt 20 has a threaded engagement within the socket bolt 26 and the said socket bolt is adapted to be turned upon the bolt 20 by means of its outwardly projecting head 27, it being noted that a collar 28 is provided upon the socket bolt adjacent its head 27 which prevents the head from passing through the calk perforation 25.

The shoe section 12 is provided upon its upper face and adjacent the toe portion 15 thereof with a slightly curved hoof engaging claw or flange 29 while each of the sections 12 and 13 are provided at opposite points upon their upper faces with side claw flanges 30.

The implement illustrated in Fig. 5 is provided with a sharpened cross head 31 at one end thereof which is adapted to form a socket 32 in the toe portion of the hoof 10, which socket is designed for the reception of the toe claw 29. The opposite end 33 of the said implement is narrowed sufficiently to allow its insertion through the opening 34 of the socket bolt head 27 for turning the socket bolt upon the bolt 20 and thus moving the said shoe sections 12 and 13 toward each other upon their hinge 14 and forcing the side claws 30 into the opposite sides of the hoof 10 or if found desirable into side sockets 35 formed in the hoof by means of the sharpened ends 36 of an implement designated as 37 and illustrated in Fig. 6 of the drawing.

With this detailed description of the invention, the complete operation thereof will be at once apparent in that the implements shown in Figs. 5 and 6 having been employed to make the side sockets 35 and a similar front socket in the hoof 10, the present device is positioned with its upper face flatly engaging the bottom of the flat shoe 11 and with the claws 30 positioned adjacent opposite sides of the hoof and the claw 29 positioned within the toe socket 32 thereof, whereupon a turning of the socket bolt by means of its head 27 forces the heel portions 23 and 18 toward each other and bringing the side claws 30 into secure seating positions within the side sockets 35 and thus firmly locking the present shoe to the horse's hoof for immediate use. It will be evident that the device is serviceable as an emergency shoe and may be readily attached to a horse's hoof when the usual shoe has been "cast" or lost and the same may be so attached without the use of the herein described socket forming implements by merely placing the shoe in position upon the hoof and forcing the same into locked position thereon by turning the socket bolt 26 and thus drawing the claws slightly indented into the adjacent portions of the hoof.

While the form of the invention herein shown and described is what is believed to be the preferable embodiment thereof, it is nevertheless to be understood that minor changes may be made in the form, proportion and details of construction without departing from the spirit and scope of the invention as set forth in the appended claims.

What I claim as new is:—

1. A horse shoe including a pair of hinged sections, hoof clamps carried by the sections, toe calks, a pair of heel calks arranged at right angles to each other, a fastening member including a bolt threaded at one end and having its other end pivotally mounted on one of said calks, there being an opening inclined at each end in the other calk, an internally threaded sleeve mounted in the said opening, a head carried by said sleeve to engage the side walls of the opening, the threaded end of said bolt adapted to be received in said threaded sleeve, and means carried by the head of the sleeve for turning the same.

2. A horse shoe including a pair of hinged sections, hoof engaging clamps carried by the sections, toe and heel calks carried thereby, a two-part fastening member carried by the heel calks, one of said members being pivotally attached to one of the heel calks, the other of said members having a swivel connection with the other heel calk, and means carried by the last-named member for causing the two-part fastening member to be adjusted as to length.

3. A horse shoe including a pair of hinged sections, hoof clamps carried thereby, toe and heel calks, the said heel calks being arranged at an angle to each other, a threaded pin carried by one of said calks, a threaded bolt pivotally mounted on said pin, a sleeve member having an enlarged head swivelly mounted in the other calks, and internally threaded for the reception of the threaded end of the bolt, whereby the shoe sections may be moved to clamping position.

4. A horse shoe comprising two separate sections, one being larger than the other and having an arched toe portion, a hinging pintle connection between the said sections, a curved claw flange secured to one face of the said toe portion, marginal inwardly projecting claw flanges carried at opposite points upon the corresponding faces of the said two sections, forwardly converging calks carried upon the opposite face of the said toe portion, a transversely positioned projecting calk carried by the heel portion of the said larger section, a longitudinally positioned calk carried by the heel portion of the smaller section and having an opening therethrough, an internally-threaded socket bolt journaled through the said opening, an externally threaded bolt having one end screw-threaded within the said socket bolt and having its other end pivotally mounted to the said transverse heel calk.

5. A horse shoe comprising two sections hingedly mounted together, hoof engaging claws carried by the said sections, a transverse heel calk carried by one of said sections, a longitudinally positioned heel calk carried by the other of said sections and having an opening therethrough, a socket bolt journaled through the said calk opening and having an internally threaded socket, a perforated operating head at the outer end of the said socket bolt, a stop collar carried by the said socket bolt adjacent the said head thereof, a pivot screw carried by the said transverse calk, a bolt pivoted upon said screw and having an externally screw-threaded portion operatively positioned within the said socket bolt.

In testimony whereof I affix my signature in presence of two witnesses.

JOHN KOSTKA.

Witnesses:
A. KAFFLER,
STANISLAS DE TOROSIEWICZ.